Figures 1, 2:
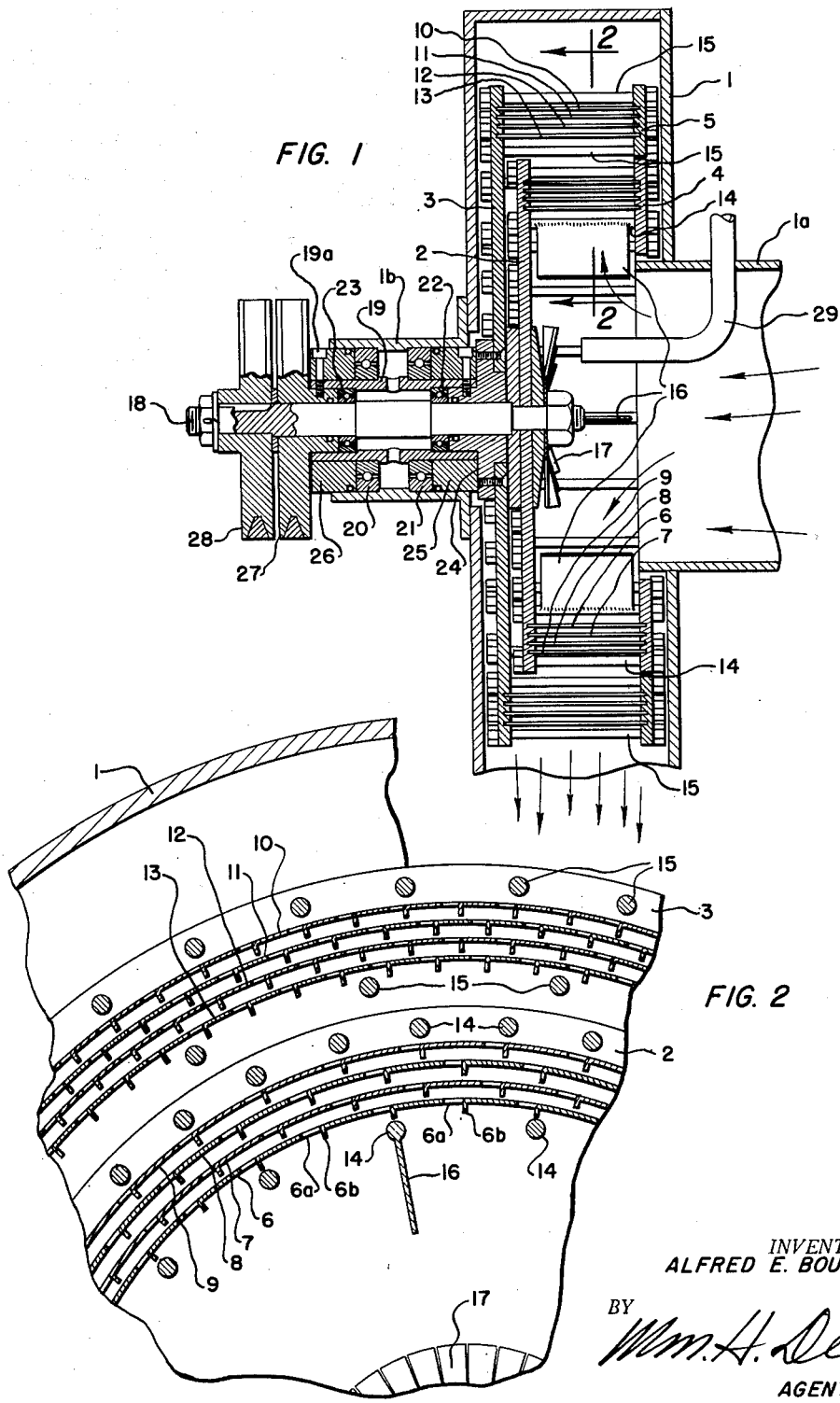

Jan. 4, 1955     A. E. BOUCHER     2,698,745
AIR CLEANER
Filed Dec. 26, 1950

INVENTOR.
ALFRED E. BOUCHER
BY
*Wm. H. Dean*
AGENT

United States Patent Office 2,698,745
Patented Jan. 4, 1955

2,698,745

AIR CLEANER

Alfred E. Boucher, Los Angeles, Calif., assignor, by mesne assignments, to Howard Earl Application December 26, 1950, Serial No. 202,663

3 Claims. (Cl. 261—90)

My invention relates to an air cleaner, and more particularly to an air cleaning rotor and blower structure, and the objects of my invention are:

First, to provide an air cleaner rotor having very efficient air cleaning characteristics, together with a volume capacity for moving air therethrough;

Second, to provide an air cleaner having a plurality of concentric rotor assemblies, provided with individual rotating means, whereby the rotor assemblies operate independently of each other, wherein air moving vanes are positioned internally of the innermost concentric rotor, in order to provide efficient forceful movement of air through the air cleaning rotor assemblies, which are specifically designed to remove very fine particles, including smoke and other microscopic foreign matter;

Third, to provide an air cleaner of this class having rotor drum structures provided with slotted portions adjacent to which projecting ribs are provided, whereby the passage of air about said ribs and through said slots causes very efficient and complete removal of foreign matter from the air;

Fourth, to provide an air cleaner of this class wherein the combination of inwardly directed air moving vanes and slotted drum rotor structures outwardly thereof performs a combined air cleaning and volume movement of air therethrough;

Fifth, to provide an air cleaner of this class in which a plurality of rotor structures are concentrically mounted, and each provided with a plurality of spaced drum members, having slots parallel to the axis thereof, provided with ribs along one side of each of said slots, all of which causes radical turbulence of air passing through said slots during the rotation of said rotor structures, particularly when said rotor assemblies are operated at different speeds or in different directions; and Sixth, to provide an air cleaner of this class which is very simple and economical of construction in proportion to its utility, efficient, durable, and which will not readily get out of order or deteriorate.

With these and other objects in view, as will appear hereinafter, my invention consists of certain novel features of construction, combination and arrangements of parts and portions, as will be hereinafter described in detail and particularly set forth in the appended claims, reference being had to the accompanying drawings and to the characters of reference thereon, forming a part of this application, in which:

Fig. 1 is a vertical sectional view of my air cleaner, showing portions thereof broken away and in section to facilitate the illustration; and Fig. 2 is an enlarged fragmentary sectional view, taken from the line 2—2 of Fig. 1.

Similar characters of reference refer to similar parts and portions throughout the views of the drawings.

The blower housing 1, rotor plates 2, 3, 4 and 5, rotor cylinders 6, 7, 8, 9, 10, 11, 12 and 13, bolts 14 and 15, vanes 16, fluid spinner 17, shaft 18, hollow shaft 19, bearings 20, 21, 22 and 23, rotor hub 24, bearing retainers 25 and 26, pulleys 27 and 28, and the fluid nozzle 29, constitute the principal parts and portions of my air cleaner.

The blower housing 1 is a substantially conventional centrifugal blower housing, and is provided with an inlet duct 1a centrally thereof at one side thereof, as shown in Fig. 1 of the drawings. The rotor plates 2 and 3 are connected to the shafts 18 and 19, respectively, and secured intermediate the drum plates 2 and 4 are the rotor cylinders 6, 7, 8 and 9, which are drum-shaped cylinders, shown best in Fig. 2 of the drawings. The rotor plates 2 and 4 are secured together by means of the through bolts 14, as shown best in Fig. 2 of the drawings, while the rotor plates 3 and 5 are held together by the bolts 15.

The bolts 14, passing through the rotor plates 2 and 4, clamp opposite edges of the drum-shaped rotor cylinders 6, 7, 8 and 9, in annular grooves in the rotor plates 2 and 4, as shown best in Fig. 1 of the drawings. The edges of these cylinders 6, 7, 8 and 9, held in the annular grooves, provides precise maintenance of the spaced relationship of the cylinders 6, 7, 8 and 9 concentric to each other, while the internal bolts 14 support the vanes 16 internally of the innermost centric rotor assembly comprising the cylinders 6, 7, 8 and 9.

It will be noted that the rotor plates 4 and 5 operate in the same plane, and that the outside diameter of the rotor plate 4 is slightly less than the inside diameters of the rotor plate 5, which cooperates with the rotor plate 3 for maintaining the cylinders 10, 11, 12 and 13 therebetween in a similar manner to the retention of the cylinders 6, 7, 8 and 9 between the rotor plates 2 and 4.

The bearings 20 and 21 are supported in the bearing housing portion 1b of the blower housing 1, which is concentric to the inlet duct 1a and in opposed relationship thereto. The inner race of these bearings 20 and 21 supports the hollow shaft 19, fixed to the hub 24, which supports the rotor plate 3. The bearings 22 and 23 are mounted internally of the hollow shaft 19, and support the shaft 18 on which the pulley 28 is fixed. The pulley 27 is fixed to the hollow shaft 19 by means of the bolt 19a.

It will be here noted that the pulleys 27 and 28 are engaged by suitable belts driven by individual motors, so that the rotor assemblies on the rotor plates 2 and 3 may operate independently in different directions or in the same direction at different speeds, if desired.

The spinner 17, fixed on the end of the shaft 18, internally of the blower housing 1, is adapted to receive water from the nozzle 29, and is provided with a plurality of fan blades which distribute the water outwardly, internally of the drum-shaped cylinder 6. The rotor cylinders 6 to 13, inclusive, are all similar in construction. The rotor cylinder 6 is drum-shaped and perforated, being provided with a plurality of slots parallel to the axis thereof, designated 6a, and along one side of each slot 6a is provided an integral rib 6b, which projects at right angles to the slot and substantially radially and internally of the cylinder, all as shown best in Fig. 2 of the drawings.

It will be noted that the dimensions of the vanes 16 may be varied radially, and that opposite edges of the vanes 16 are provided with substantial clearance adjacent to the rotor plates 2 and 4, providing freedom in the propulsion of air in volume through the rotor assemblies in connection with the plates 2 and 3.

The operation of my air cleaner is substantially as follows:

When the rotor assemblies on the plates 2 and 3 are rotated by means of the pulleys 28 and 27, respectively, air is centrifugally dispelled by the vanes 16, causing the same to move outwardly through the rotor cylinders 6, 7, 8, 9, 10, 11, 12 and 13, through the slots therein, and the ribs hereinbefore described, adjacent these slots, cause considerable turbulence of the air passing through the rotor assemblies, which cleans the air of foreign matter, which foreign matter is collected in moisture introduced into the blower housing 1 by means of the nozzle 29.

Concurrent distribution of liquid by means of the spinner 17 from the nozzle 29, with the passage of air through the slots in the rotor assemblies, causes complete wetting of microscopic particles carried in the air, and carrying off of the particles by the liquid through a single air and liquid discharge passage as shown in Fig. 1 at the bottom of the housing 1, or through separate air and liquid discharge passages, if desired. Thus foreign particles may be wetted and entrained in the water and conducted to a point of collection (not shown) in the form of a flowable liquid.

It will be noted that the rotor assemblies on the plates 2 and 3 may be operated at different speeds, or in different directions, independently of each other, as desired. The vanes 16, being provided with clearance on three sides thereof, and being positioned at the inner portion of the innermost rotor assembly, provide for the volumetric delivery of air through my air cleaner.

Though I have shown and described a particular construction, combination and arrangement of parts and portions, I do not wish to be limited to this particular construction, combination and arrangement, but desire to include in the scope of my invention the construction, combination and arrangement substantially set forth in the appended claims.

Having thus described my invention, what I claim as new and desire to secure by Letters Patent is:

1. In air cleaning apparatus: a housing having a side opening; a plurality of rotatably mounted concentric shafts extending into said housing opposite said opening; a plurality of circular rotor plates carried by said shafts said plates being of decreasing diameter towards said opening and having outwardly spaced inwardly opening grooves on their marginal inner faces; cylindrical concentric drums having axially extending parallel slots therein, said drums having corresponding end edges seated in said grooves; annular concentric rotor plates having similarly outwardly spaced inwardly opening grooves on their inner faces in which the other corresponding end edges are seated so as to form separately rotatable outer and inner drum assemblies; projectiong means adjacent said slots for producing turbulence of the air passing through said slots; means clampingly securing said rotor plates against the drum ends; vanes carried by and rotatable with the inner drum assembly for sucking air through said opening and forcing it outwardly through said drums; a spinner centrally of and rotatable with said inner drum assembly having radially extending blades; and means for delivering fluid within said inner drum assembly including a nozzle for directing the fluid against said spinner blades, said blades acting to forcibly sling the fluid outwardly towards the drum assemblies.

2. In air cleaning apparatus: a housing having a side opening; a plurality of rotatably mounted concentric shafts extending into said housing opposite said opening; a plurality of circular rotor plates carried by said shafts, said plates being of decreasing diameter towards said opening and having outwardly spaced inwardly opening grooves on their marginal inner faces; cylindrical concentric drums having axially extending parallel slots therein, said drums having corresponding end edges seated in said grooves; annular concentric rotor plates having similarly outwardly spaced inwardly opening grooves on their inner faces in which the other corresponding end edges are seated so as to form separately rotatable outer and inner drum assemblies; projecting means adjacent said slots for producing turbulence of the air passing through said slots; means clampingly securing said rotor plates against the drum ends; means for moving air through said opening and outwardly through said drum assemblies, and between said rotor plates at the drum ends; a spinner centrally of and rotatable with said inner drum assembly having radially extending blades; and means for delivering a fluid within said inner drum assembly including a nozzle for directing the fluid against said spinner blades, said blades acting to forcibly sling the fluid outwardly towards the drum assemblies.

3. In air cleaning apparatus: a housing having a side opening; a plurality of rotatably mounted concentric shafts extending into said housing opposite said opening; a plurality of circular rotor plates carried by said shafts, said plates being of decreasing diameter towards said opening and having outwardly spaced inwardly opening grooves on their marginal inner faces; cylindrical concentric drums having slot openings therein, said drums having corresponding end edges seated in said grooves; annular concentric rotor plates having similarly outwardly spaced inwardly opening grooves on their inner faces in which the other corresponding end edges are seated so as to form separately rotatable outer and inner drum assemblies; projecting means adjacent said slot openings for producing turbulence of the air passing through said openings; bolts clampingly securing said plates against the ends of their associated drums in each drum assembly; radially extending vanes supported on certain of said bolts within inner drum assembly for sucking air through said opening and forcing it outwardly through said drums between said rotor plates; a spinner positioned at the axis of rotation of the inner drum having radially extending blades; and means for delivering a fluid within said inner drum assembly including a nozzle for directing the fluid against said spinner blades, said blades acting to forcibly sling the fluid outwardly towards the drum assemblies in the path of movement of air from said side opening.

References Cited in the file of this patent

UNITED STATES PATENTS

| | | |
|---|---|---|
| 1,049,317 | Theisen | Dec. 31, 1912 |
| 1,051,017 | Schmidt | Jan. 21, 1913 |
| 1,273,791 | Knowles | July 23, 1918 |
| 1,415,294 | Baldwin | May 9, 1922 |
| 1,690,813 | Birkholz | Nov. 6, 1928 |

FOREIGN PATENTS

| | | |
|---|---|---|
| 23,595 | Great Britain | Oct. 23, 1896 |
| 786,506 | France | June 8, 1935 |
| 126,226 | Austria | Jan. 11, 1932 |